United States Patent [19]
Andrews

[11] Patent Number: 5,618,152
[45] Date of Patent: Apr. 8, 1997

[54] PRINTING MACHINE SPINDLE LIFTING AND TRANSPORTING CART

[76] Inventor: Jeffrey F. Andrews, 2500 Nettleton Rd., Coeur d'Alene, Id. 83814

[21] Appl. No.: 421,383

[22] Filed: Apr. 13, 1995

[51] Int. Cl.$^6$ ..................................................... B60P 1/34
[52] U.S. Cl. ........................................... 414/546; 414/911
[58] Field of Search ............................ 414/546, 911, 414/458, 684; 254/8 R, 120, 121; 242/557, 561, 559.1, 559.4

[56] References Cited

U.S. PATENT DOCUMENTS

| | | | |
|---|---|---|---|
| 764,344 | 7/1904 | Buckelew | 414/458 |
| 915,721 | 3/1909 | Aldous | 414/546 X |
| 2,543,381 | 2/1951 | Rosenzweig | 414/458 |
| 3,279,753 | 10/1966 | Ventriglio et al. | 254/8 R |
| 3,474,978 | 10/1969 | Klose | 414/684 X |
| 3,747,787 | 7/1973 | Sloan et al. | 414/458 |
| 5,421,691 | 6/1995 | Ferrone | 414/911 X |
| 5,456,566 | 10/1995 | Kniley et al. | 414/911 X |

*Primary Examiner*—David A. Bucci
*Attorney, Agent, or Firm*—Wells, St. John, Roberts, Gregory & Matkin, P.S.

[57] ABSTRACT

A printing machine spindle lifting and transporting cart is described, for lifting and transporting printing machine spindles. The cart includes a cart frame with upright sides extending between front and back side edges. The upright sides further include a top spindle support surface. Wheels are positioned under the cart frame and for movably supporting the cart frame on a support surface. The wheels are situated adjacent the front and back side edges. A lift frame includes a lift handle adjacent the back side edges, and upstanding spindle engaging hooks are situated at a forward handle end. A spindle ramp surface extends from the hook toward the handle. The hook projects forwardly of the cart frame. Pivots mount the lift frame to the cart frame for selective pivotal movement thereon about a lift frame axis situated between the front and back wheels and adjacent the top spindle support surface such that the handle may be operated to pivot the lift frame between a first position wherein the hook is positioned below the lift frame axis, and a second position wherein the hook is positioned above the lift frame axis.

14 Claims, 2 Drawing Sheets

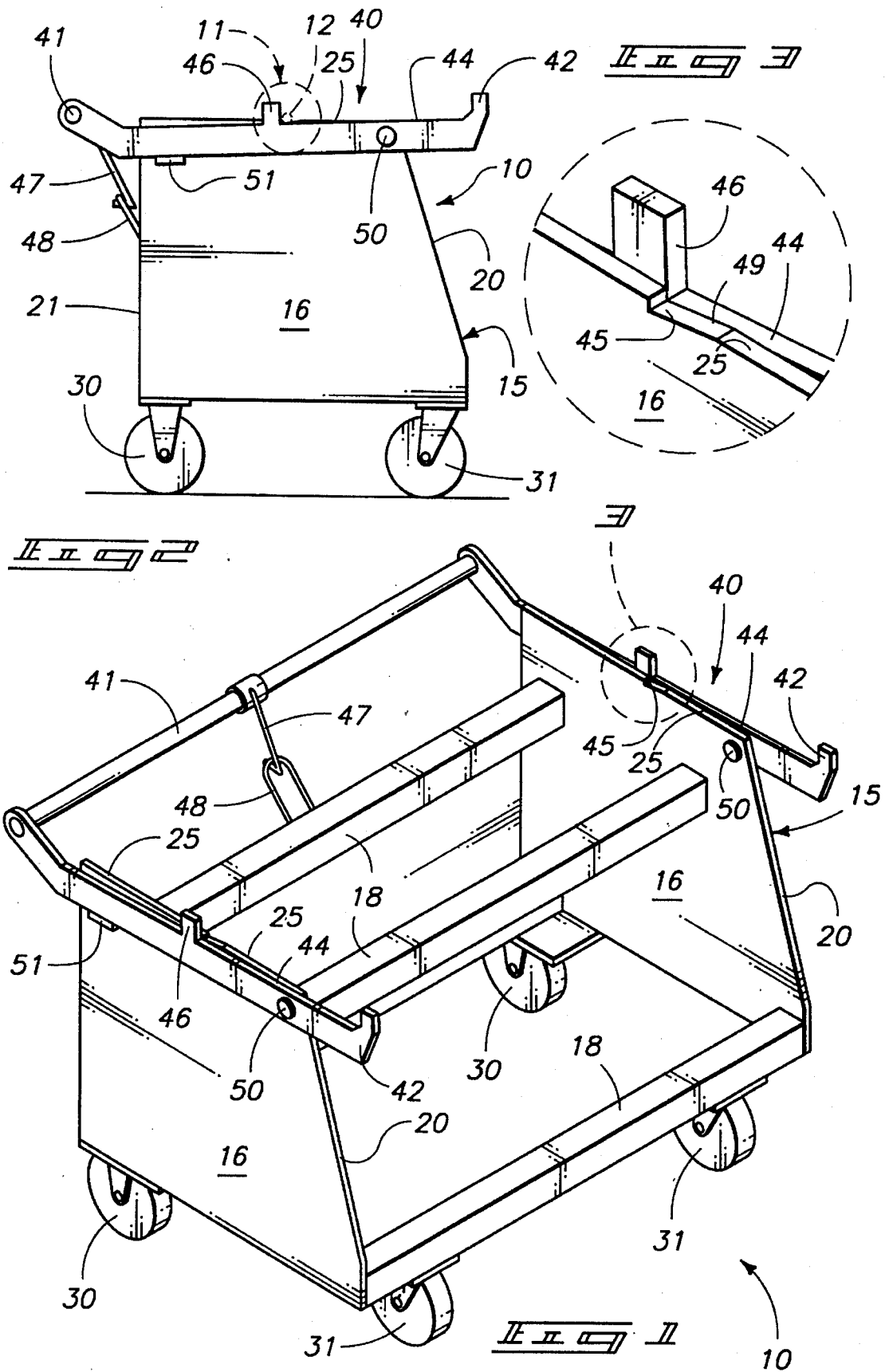

PRINTING MACHINE SPINDLE LIFTING AND TRANSPORTING CART

TECHNICAL FIELD

The present invention relates to lifting and handling of printing machine spindles of the type used to carry spools of paper or other printing medium for use on printing machines.

BACKGROUND OF THE INVENTION

It takes extremely strong arms to mount and dismount printer spindles to printing machines, especially since the spindles are to be mounted within the printing machines in out-of-the-way locations under the machine frame. Persons intending to mount or remove a spindle, be it empty or full, must access the area within the printing machine by bending and reaching under the machine frame.

Even empty spindles are heavy, and the awkward location of the spindle in a printing machine increases the effort required to remove it safely from its mounted position within the machine. For safety, at least two relatively strong individuals are required to remove and mount spindles. However, time constraints often dictate that the closest person available perform the job and the result can quite easily be back strain or injury.

Lifting carts have been made available for transporting other types of spools. One example is illustrated in U.S. Pat. No. 3,279,753 granted to Ventriglio et al. The disclosed spool carrier is used primarily for cable spools and is not directed to the problem of mounting and dismounting spools from printing presses. The cart includes a wheel supported frame with a pivoted lifting frame. The lifting frame includes a semi-circular cut-out at a forward end, and a handle at an opposite end. The center shaft of a spindle is received in the cut-out and is lifted by pushing down on the handle. A stop limits pivotal movement of the handle so the cut-out area never becomes elevated above the pivot axis for the lift frame. The entire arrangement is not intended to shift the spool back and forth on the frame to and from a location between the wheels, but simply to lift the spool to facilitate stripping of cable therefrom. Consequently, such a device could not be adequately used for mounting and dismounting paper spindles from printing presses.

Other lifting devices have also been developed for hoisting and transporting spools. U.S. Pat. No. 764,344 to Buckelew for example shows a lift truck for paper rolls and the like that does allow some lateral shift of the spool, but includes a frame and front wheel structure that projects forwardly of the lifting frame and, as such would not permit adequate access to printing machines. While the lift frame provides a latch mechanism to hold the frame in the lifted position, the entire weight of the spool is always born directly on the lift frame at a position upwardly adjacent to the front wheels of the truck, and forward of the pivot axis.

Other spool lift devices have similar structural design obstacles that prevent their use for the intended purpose of the present invention, to enable a single person to safely and easily mount and dismount and transport printing paper spools to and from printing presses.

The present invention thus has for an objective, a solution to the above problems by provision of a lifting and transporting cart with specific structural features that enable safe and easy use unique to the printing industry in removing, mounting and transporting printing paper rolls to and from printing presses.

BRIEF DESCRIPTION OF THE DRAWINGS

Preferred embodiments of the invention are described below with reference to the accompanying drawings, which are briefly described below.

FIG. 1 is a perspective view of a first preferred form of the present printing machine spindle lifting and transporting cart;

FIG. 2 is a side elevation view of the cart with a spindle mounted thereto and with the spindle shown in dashed lines;

FIG. 3 is an enlarged fragmentary perspective view of a portion identified by numeral 3 in FIG. 1;

DETAILED DESCRIPTION OF THE PREFERRED EMBODIMENTS

Figure 4:
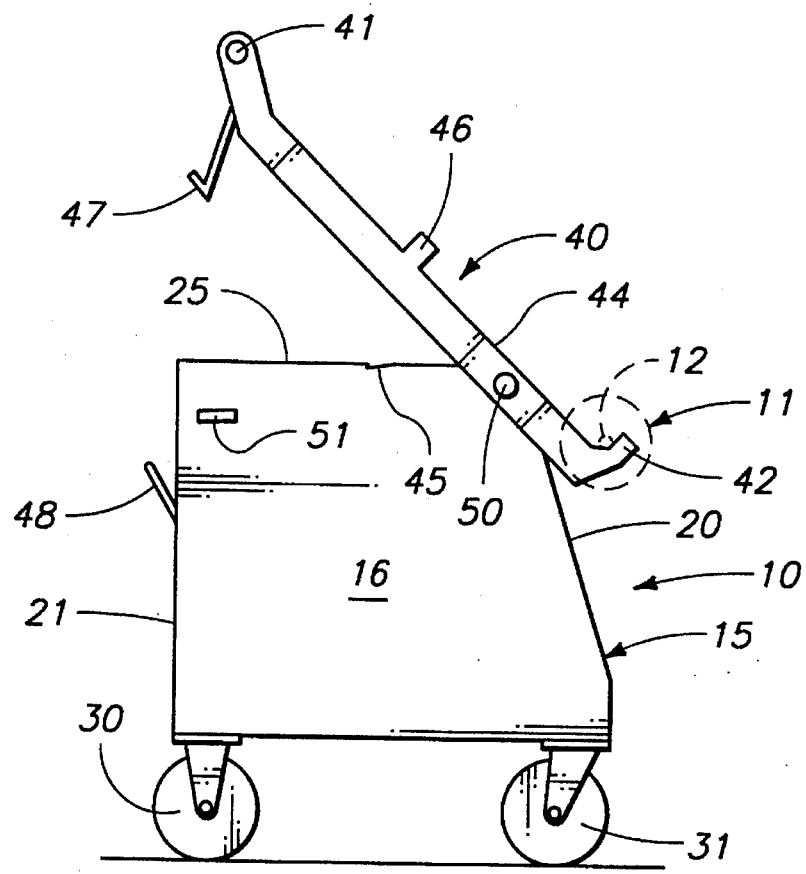
FIG. 4 is a side elevation view similar to FIG. 2 only showing the lift frame in an upwardly pivoted first position.

This disclosure of the invention is submitted in furtherance of the constitutional purposes of the U.S. Patent Laws "to promote the progress of science and useful arts" (Article 1, Section 8).

A preferred form of the present invention is illustrated by way of example in the accompanying drawings and is generally designated therein by the reference numeral 10.

The cart 10 is specifically provided for use in lifting and transporting printing paper spindles 11, one of which is shown in end view by dashed lines in FIG. 2 and in position to be transported on the present cart 10. The same spindle 11 is also shown in FIG. 4 in position to be mounted to or removed from a printing press (not shown).

Cart 10 includes a rigid cart frame 15 fabricated of structural steel or other appropriate strong, rigid construction materials. It includes, upright sides 16, that are rigidly supported in spaced relation by plural structural members 18.

The sides extend between front 20 and back side edges 21. Thus, for purposes of clarity, the front of the cart is defined by front edges 20, and the back or rearward portions of the cart are located near of adjacent to the back side edges 21.

Figure 5:
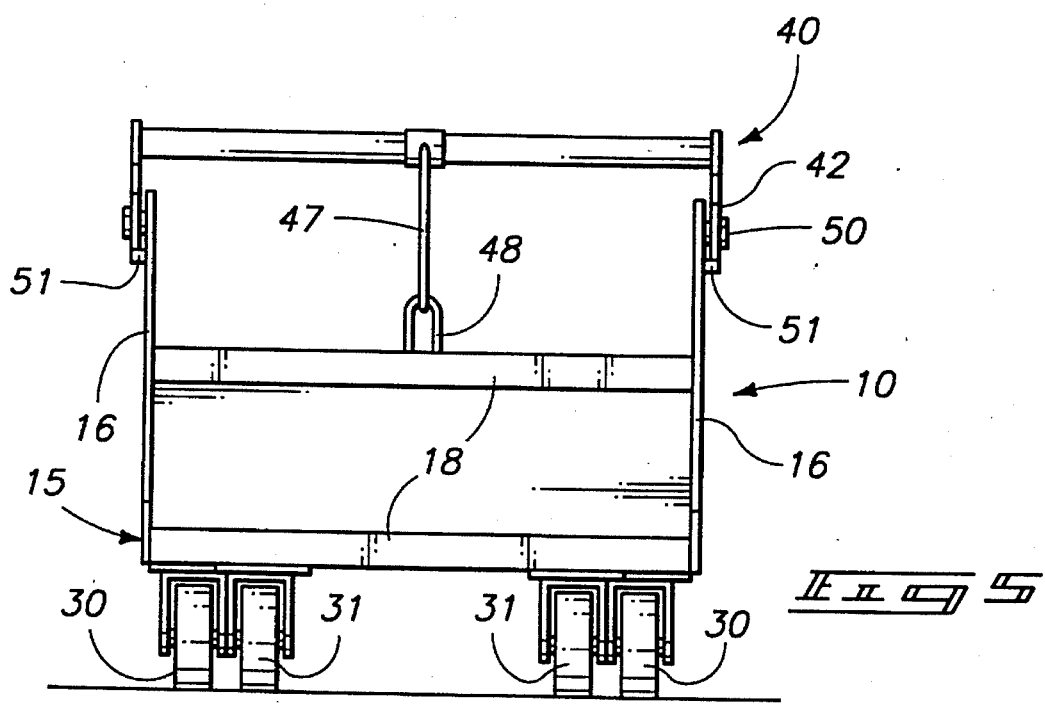
FIG. 5 is a front side elevational view.

Each side also includes a top spindle support surface 25 thereon. The spindle support surfaces 25, are preferably substantially horizontal or parallel to a support surface such as the floor surfaces shown in FIGS. 2, 4, and 5. The surfaces are also located rearwardly, toward the back edges 21, from the front edges 20. More specific description will be given relative to the placement of the surfaces 25 following detailed description of the remaining elements of the preferred cart.

The cart is advantageously wheel supported, with floor engaging wheels 30, 31 carried under the cart frame. In a preferred form, at least one but preferably two rearward wheels 30 are provided under the frame adjacent the back side edges 21. It is preferred that two such rear wheels 30 be provided, each under the frame and below a respective side 16. These wheels may be of the fixed castor variety commonly known.

Also in a preferred form, at least one but preferably two front wheels 31 are provided under the frame and adjacent the front side edges 21. To facilitate maneuverability, the front wheels are preferably of the pivoted or "crazy" wheel variety also commonly known. It is preferred that one of the front wheels 31 be situated under each of the respective sides 16, slightly rearward of the front edges 20 thereof. Both sets of wheels are thus situated within the confines of the cart frame and do not project forward or rearwardly thereof.

The top spindle support surfaces 25 are elevated above the floor surface by a distance just slightly higher than the standard spindle support racks (not shown). For example, if typical rack height is approximately 25 inches, a distance from the floor to the support surfaces 25 would be approximately 25 ¼ inches.

A lift frame 40 is pivotably mounted to the cart frame 15. The lift frame 40 is constructed of rigid structural materials such as steel and is assembled, as is the cart frame, by standard fastening technology such as welding, bolts, screws, etc.

The lift frame 40 includes a lift handle 41 at a rearward end, and spindle engaging hooks 42 at a forward handle end. The handle is somewhat rearwardly positioned with respect to the back side edges of the sides 16, and the hooks 42 are positioned forward of the front edges 20. It is preferred that the hooks 42 be positioned forward of the front edges 20 in order that none of the frame project into and obstruct positioning of the cart when used to remove and mount spindles to printing presses.

The lift frame is pivotably mounted to the cart frame by pivots 50, constructed of standard pin and bushing or bearing arrangements. The pivots 50 mount the lift frame 40 to the cart frame 15 for selective pivotal movement thereon about a horizontal lift frame axis that is situated between the front and back side edges 20, 21, and the front and back wheels 31, 30. The pivot axis is also situated elevationally adjacent to the top spindle support surface 25 such that the handle may be operated to pivot the lift frame between a first position (FIG. 4) wherein the hooks 42 are positioned below the lift frame axis, and a second position (FIGS. 1–3 and 5) wherein the hooks 42 are positioned above the lift frame axis.

The lift frame also includes spindle ramp surfaces 44 that extend rearwardly from the respective hooks 42 toward the handle 41. The ramp surfaces 44 are situated just slightly below and rearwardly inclined with respect to the spindle support surfaces 25 of the cart frame when in the second position (see FIGS. 1–3).

The height of the top support surfaces 25 relative to the spindle ramp surfaces 44 is such that the spindle 11 can easily be shifted to the support surfaces 25 from the ramp surfaces 44 and carried with the weight directly on the cart frame, and with the spindle weight substantially centered between the supporting wheels. This allows the lift frame to be free of the spindle weight and to enable the lift frame to be tilted with the spindle in place on the cart frame to again engage the spindle and roll it gently onto a storage rack of the approximate same height of the support surfaces (not shown), or to allow the spindle to roll down the spindle ramp surface to the hooks to facilitate removal or placement of the spindle in the printing press, at a lower position.

Provision is made in the preferred cart, for releasably holding the spindle 11 in a relatively centered position on the cart frame as shown in FIG. 2 of the drawings. Specifically, means is provided in one form as a stop 46. In the preferred form shown, stops 46 are provided on the lift frame rearwardly adjacent the ramp surfaces 44. The stops 46 are situated along the lift frame such that they prevent the spindle 11 from rolling toward the handles 41. They are situated along the lift frame such that the spindle 11 will not roll past a point approximately midway between the front and back wheels 31, 30. Thus the weight of the spindle is substantially centered between the wheels to facilitate transport, and to locate the spindle within the confines of the cart to facilitate maneuverability.

In the preferred form, the stops 46 are shown mounted to the lift frame 40. However it is also possible to mount the stops directly to the cart frame for the same purpose.

Within the example illustrated, indentations 45 are provided on the cart frame 20, along the top spindle support surfaces 25 for releasably receiving the spindle. The indentations 45 are identical, one being clearly shown in FIG. 3 in relation to the adjacent support surface 25 and spindle ramp surface 44. The indentations function similarly to the stops 46, but also include the ability to prevent unintentional rolling of the spindle 11 to the front during transport.

To this end, the indentations are formed with rearwardly and downwardly leading inclined surfaces 49 (FIG. 3) that allow the spindle to roll down off the support surface 25 and against the stops 46. The spindle can be moved back up the inclined surfaces 49 simply by intentionally lifting upwardly on the handle 41, to bring the spindle ramp surfaces 44 into engagement with the spindle and cause the spindle to roll forwardly up the surfaces 49 and onto the surfaces 25 and 44.

Provision is made in a preferred form, for selectively latching the lift frame 40 in the second position shown in FIGS. 1–3 and 5. Such provision is made in a preferred form by a latch 48 on the cart frame and a catch hook 47 on the lift frame selectively engageable with the latch 48, to hold the lift frame in the second position.

The latch 48 is simply comprised of a rigid loop affixed to the cart frame, in pivotal alignment with the catch hook 47. The catch hook 47 is pivotably mounted to the handle 41, to be selectively pivoted by the operator into and away from engagement with the latch 48 when the latch frame is in the second position.

To further assure a secure position of the lift frame 40 in its second position, stop lugs 51 are advantageously provided on the cart frame. The lugs 51 are positioned to abut the lift frame 40 when at the second position, and to prevent further downward pivotal movement thereof beyond the second position.

The stop lugs 51, catch 47 and latch 48 function together to substantially lock the lift frame in the second position when in operation. The lift frame, thus locked will not pivot unintentionally so the handle 41 can be used safely when pushing or pulling the cart about.

From the above description, operation of the invention may now be easily understood.

Firstly, it may be understood that the cart may be moved freely about on the wheels into position relative, say to a printing press where a spindle is to be removed. The front caster wheels permit maneuvering the cart relative to the press frame. Further the spacial relation of the front wheels, front cart frame side edges 20, and forwardly projecting hooks permit access to the proximity of the spindle.

Once the cart is properly positioned, the lift frame is lowered to shift the hooks 42 under the spindle shaft. This is done by releasing the catch 47 and lifting upwardly on the handle 41. The hooks 42 swing downwardly to clear the spindle and the cart is pushed forwardly to bring the hooks under the spindle.

Now the handle 41 is pushed downwardly to swing the hooks upwardly to engage and lift the spindle from its journals on the printing press. The weight of the spindle is now borne by the lift frame, and the user is able to pull the cart frame clear of the press.

Once the spindle is clear of the press, the handle can be further pushed downwardly to lift the spindle. As the hooks become elevated above the pivots 50, the spindle will roll down the slightly inclined ramp surfaces 44 and onto the top spindle support surfaces 25 of the cart frame. The weight of the spindle thus shifts rearwardly of the pivot axis as it rolls toward a centered position between the front and back wheels 31, 30.

The stops 46 prevent the spindle from rolling further back toward the handle as the spindle rolls down the inclined surfaces 49 of the indentations 45 and the spindle weight shifts directly to the cart frame.

Once the spindle is received within the indentations and is properly positioned, the catch and latch members may be engaged to lock the lift frame against the lugs 51. This may be done automatically as the catch member 47 swings down and is cammed over the latch 48, or the user can manually lift the catch 47 and subsequently drop it over the latch 48 as the lift frame reaches the second position shown in FIG. 2.

The cart is now ready for transport. This is done simply by using the handle 41 to push or pull the cart which, bearing the centered weight of the spindle, is easily maneuvered away from the press and toward a storage rack.

The cart may be easily maneuvered into position adjacent the rack, with the spindle now at the approximate level of the rack supports (not shown). Now the catch 47 is disconnected from the latch 48 and the handle 41 is lifted. The upwardly pivoting ramp surfaces 44 engage and move the spindle forwardly from the indentations 45, and along the spindle support surfaces 25, toward the hooks 42.

In situations where the storage rack support surfaces are in close elevational proximity to the spindle support surfaces 25, the spindle will roll directly onto the rack. If the rack is slightly lower, the spindle may be rolled further out the lift frame to the hooks and be lowered onto the rack as the handle 41 moves on upwardly. Once the spindle rolls onto the rack, the hooks can be pivoted on downwardly clear of the deposited spindle and the cart may be pulled or pushed away unloaded.

To remove a spindle from a rack and mount it to a printing press, the above procedures are simply reversed. However, when the lever is lifted to shift the spindle to the press, the handle will typically be lifted higher, and the spindle will be allowed to roll forwardly to the hooks 42. This shifts the spindle forward of the cart frame, and positions it properly within the confined area of the press for mounting. The cart can be maneuvered with the spindle thus cantilevered, to precisely position the spindle in relation the spindle receiving journals of the press. Forward transition of the spindle from the top support surfaces 25 of the cart frame to the ramp surfaces 44 is smooth and gradual due to the location of pivots 50 and the relationship of the surfaces 44, 25 as shown and described above.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A printing machine spindle lifting and transporting cart, for lifting and transporting a printing machine spindle having a substantially cylindrical central spindle shaft, comprising:

a cart frame including upright sides extending between front and back side edges;

wherein the upright sides further include a top spindle support surfaces thereon;

four wheels including two front wheels and two rear wheels positioned under the cart frame and mounted to the cart frame for movably supporting the cart frame on the support surfaces;

wherein the two rear wheels are situated adjacent the back side edges and the two front wheels are situated adjacent the front side edges and are spaced apart by a distance less than the distance between the rear wheels;

a lift frame including a lift handle adjacent the back side edges and an upstanding spindle engaging hooks at a end of the lift frame, with spindle ramp surfaces extending from the hooks toward the handle;

wherein said hooks project forwardly of the cart frame;

wherein the front wheels are positioned along the cart frame between the hooks; and a pivot mounting the lift frame to the cart frame for selective pivotal movement thereon about a lift frame axis situated between the front and back wheels and adjacent the top spindle support surfaces such that the handle may be manually operated to pivot the lift frame between a first position wherein the hook is positioned below the lift frame axis and the spindle ramp surfaces are inclined forwardly to roll a spindle carried on the lift frame toward the hooks, and a second position wherein the hooks are positioned above the lift frame axis and the spindle ramp surfaces are inclined rearwardly to roll a spindle carried thereon toward the top spindle support surfaces and to a point on the frame where the spindle is substantially centered between the front and rear wheels.

2. A printing machine spindle lifting and transporting cart as claimed by claim 1, wherein the top spindle support surfaces of the cart frame are positioned rearward of the lift frame axis and with portions thereof at an elevation higher than the spindle ramp surfaces with the lift frame in the second position.

3. A printing machine spindle lifting and transporting cart as claimed by claim 1, further comprising:

stop means on the cart for preventing the spindle from rolling toward the handle past a point approximately midway between the front and rear wheels.

4. A printing machine spindle lifting and transporting cart as claimed by claim 1, further comprising:

a stop on the lift frame for preventing the spindle from rolling toward the handle past a point situated approximately midway between the hooks and lift handle.

5. A printing machine spindle lifting and transporting cart as claimed by claim 1, further comprising:

an indentation on the cart frame, along at least one of the top spindle support surfaces for receiving the spindle.

6. A printing machine spindle lifting and transporting cart as claimed by claim 1, further comprising:

an indentation on the cart frame, along the top spindle support surfaces for receiving the spindle; and a stop on the lift frame for preventing the spindle from rolling toward the handle, past a point situated approximately midway between the front and rear wheels.

7. A printing machine spindle lifting and transporting cart as claimed by claim 1, wherein the lift frame axis is situated relative to the top spindle support surfaces and spindle ramp surfaces such that at least part of the top spindle support surfaces are situated above the spindle ramp surfaces with the lift frame in the second position thereof.

8. A printing machine spindle lifting and transporting cart as claimed by claim 1, further comprising:

wherein the lift frame axis is situated relative to the top spindle support surfaces and spindle ramp surfaces such that at least part of the top spindle support surfaces are situated above the spindle ramp surfaces with the lift frame in the second position thereof; and an indentation on the cart frame, along that part of the top spindle support surfaces exposed above the spindle ramp surfaces with the lift frame in the second position, for receiving the spindle.

9. A printing machine spindle lifting and transporting cart as claimed by claim 1, further comprising:

wherein the lift frame axis is situated relative to the top spindle support surfaces and spindle ramp surfaces such that at least part of the top spindle support surfaces are situated above the spindle ramp surfaces with the lift frame in the second position thereof;

an indentation on the cart frame, along that part of each top spindle support surface exposed above the spindle ramp surfaces with the lift frame in the second position, for receiving the spindle; and wherein the indentation is situated rearwardly of the lift frame axis, and the lift frame axis is situated in a reference plane rearwardly of the front wheels.

10. A printing machine spindle lifting and transporting cart as claimed by claim 1, wherein the pivot is situated on the cart frame along a reference plane rearwardly adjacent the front wheels.

11. A printing machine spindle lifting and transporting cart as claimed by claim 1, further comprising:

a stop lug on the cart frame for engagement with the lift frame to limit pivotal movement of the lift frame at the second position thereof.

12. A printing machine spindle lifting and transporting cart as claimed by claim 1, further comprising:

a latch on the cart frame; and a catch hook on the lift frame selectively engageable with the latch, to hold the lift frame in the second position.

13. A printing machine spindle lifting and transporting cart as claimed by claim 1, further comprising:

a stop lug on the cart frame for engagement with the lift frame to limit pivotal movement of the lift frame at the second position thereof;

a latch on the cart frame; and a catch hook on the lift frame selectively engageable with the latch, to hold the lift frame in the second position.

14. A printing machine spindle lifting and transporting cart, for lifting and transporting a printing machine spindle having a substantially cylindrical central spindle shaft, comprising:

a cart frame including upright sides extending between front and back side edges;

four wheels including two front wheels and two rear wheels under the cart frame and mounted to the cart frame between the upright sides for movably supporting the cart frame on a support surface;

wherein the two front wheels are spaced apart by a distance less than the distance between the rear wheels;

wherein the back wheels are positioned inwardly adjacent the back side edges and the front wheels are positioned inwardly adjacent the front side edges of the upright sides;

a lift frame including a lift handle adjacent the back side edges and upstanding spindle engaging hooks at a forward lift frame end forwardly adjacent the front side edges, and front wheels;

spindle ramp surfaces extending from the hooks toward the handle;

a pivot mounting the lift frame to the cart frame for selective pivotal movement thereon about a lift frame axis situated between the front and rear wheels such that the handle may be manually operated to pivot the lift frame between a first position wherein the hooks are positioned below the lift frame axis and the spindle ramp surfaces are inclined forwardly such that a printing machine spindle on the spindle ramp surfaces will tend to roll forwardly toward the hooks, and a second position wherein the hooks are positioned above the lift frame axis and the spindle ramp surfaces are inclined rearwardly such that a spindle on the ramp surfaces will tend to roll rearwardly toward the handle;

wherein said hooks project forwardly of the front edges of the cart frame and front wheels in the first and second positions;

a stop lug on the cart frame and positioned thereon to limit pivotal motion of the lift frame at the second position thereof; and a stop on the lift frame positioned to stop rearward rolling motion of the spindle, at a location approximately centered between the front and rear wheels with the lift frame in the second position;

a latch and catch hook on the cart frame and lift frame selectively engageable to hold the lift frame in the second position.

* * * * *